No. 789,120.                                                                                           Patented May 2, 1905.

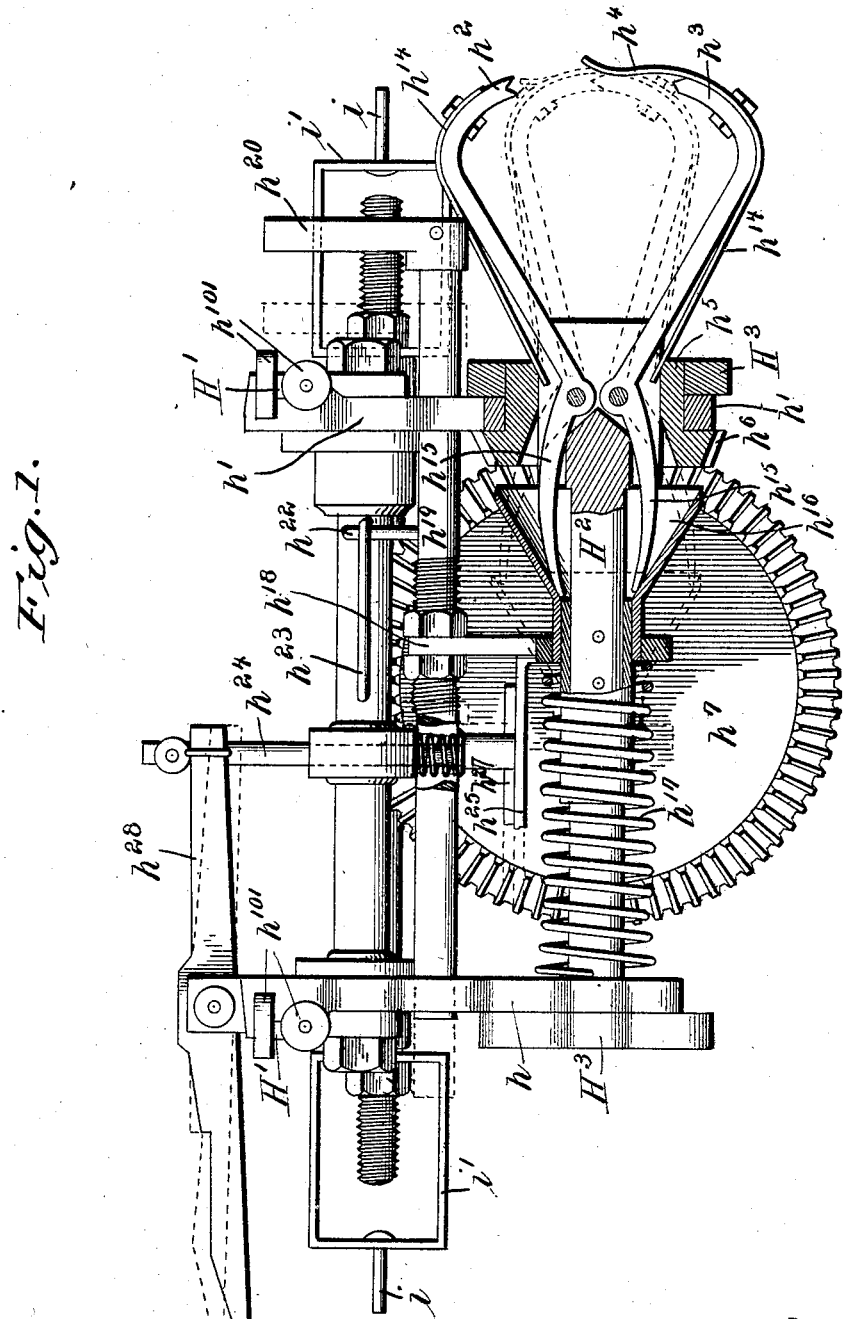

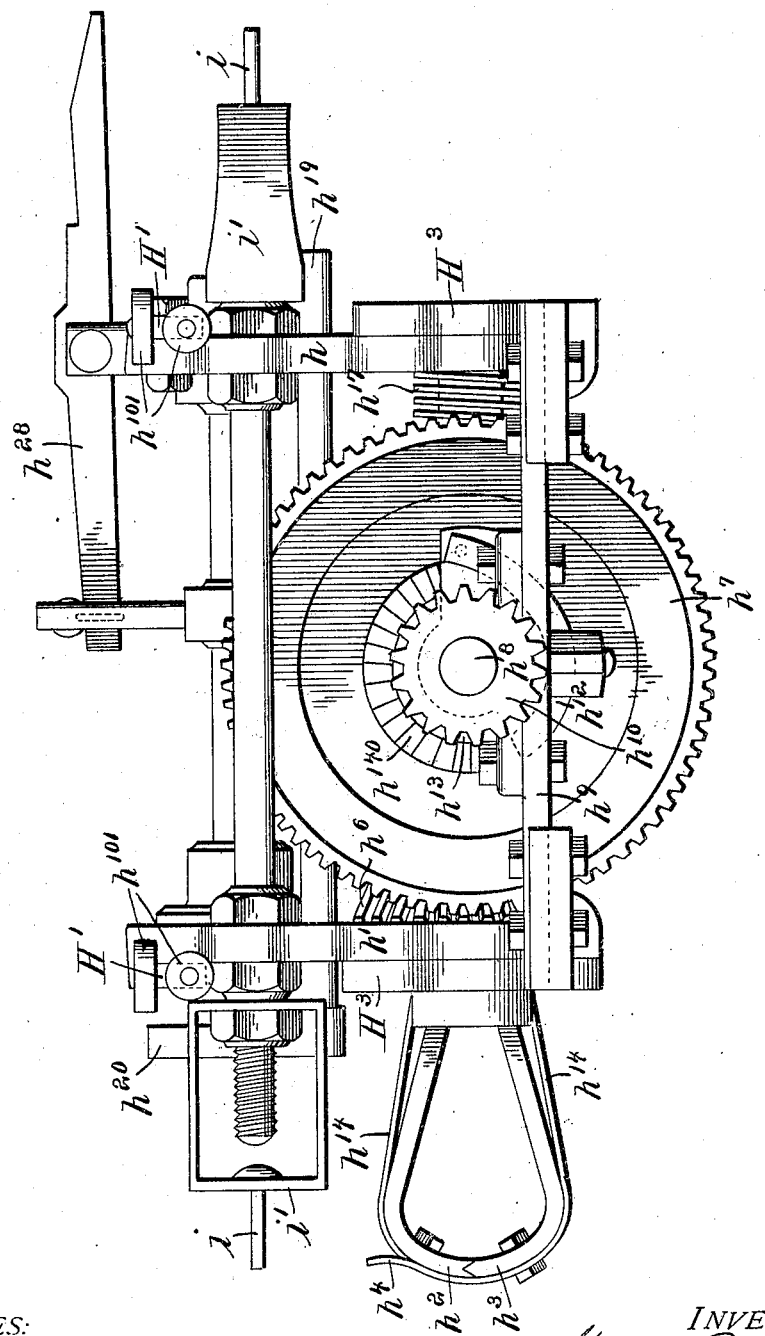

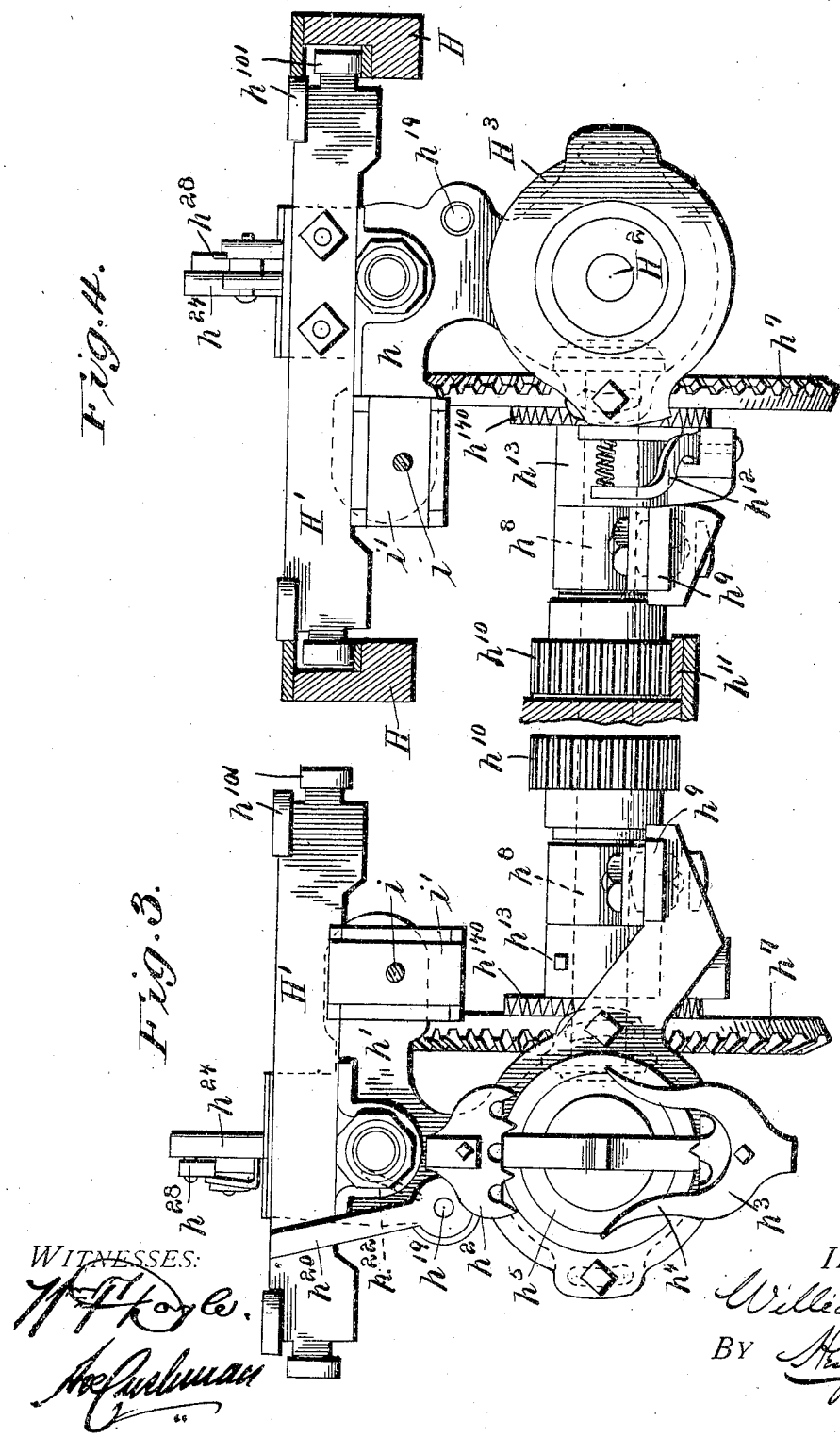

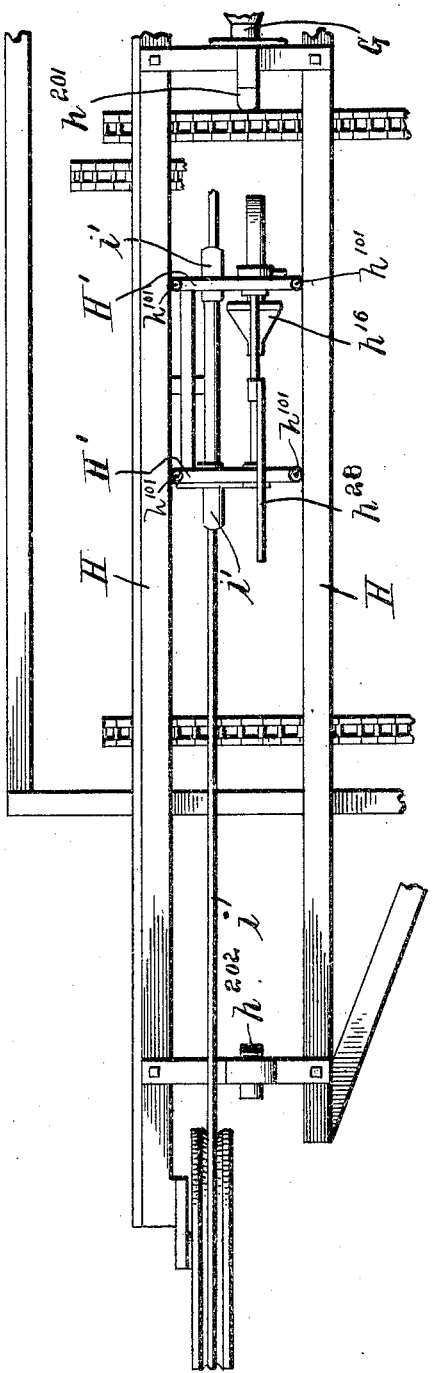

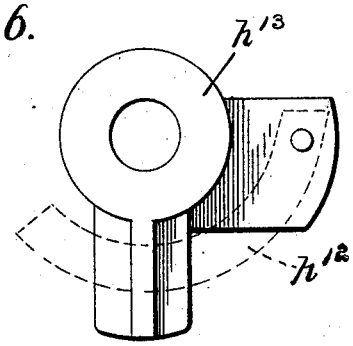
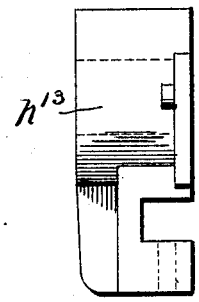
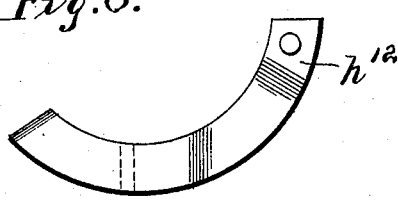
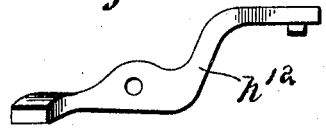
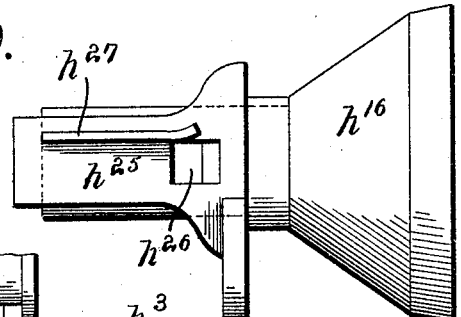
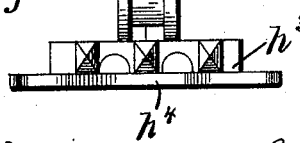
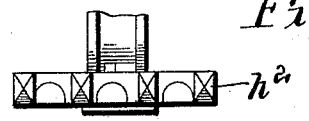
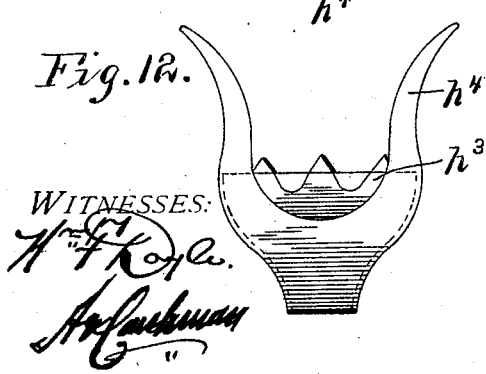
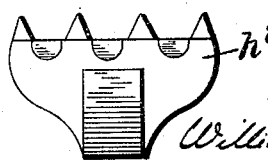

UNITED STATES PATENT OFFICE.

WILLIAM DOUGLASS, OF PHILLIPSBURG, KANSAS.

BAND-TWISTER.

SPECIFICATION forming part of Letters Patent No. 789,120, dated May 2, 1905.

Original application filed June 14, 1902, Serial No. 111,721. Divided and this application filed May 28, 1904. Serial No. 210,304.

*To all whom it may concern:*

Be it known that I, WILLIAM DOUGLASS, a citizen of the United States, residing at Phillipsburg, in the county of Phillips and State of Kansas, have invented certain new and useful Improvements in Band-Twisters, of which the following is a specification, reference being had therein to the accompanying drawings.

The present invention relates to twisting devices, and is designed for use particularly in connection with self-binder harvesters of the type shown in my application for patent filed June 14, 1902, Serial No. 111,721, of which application the present case is a division, although it will be understood that the twisting mechanism forming the subject-matter of the present case is capable of use wherever it is desired to twist loose strands or fibers into a band.

Briefly stated, the invention comprises a twister-carriage supported upon suitable tracks or runways, upon which tracks said carriage is to be reciprocated by any suitable driving means; band-grasping jaws on said carriage adapted to automatically grasp a band at the dwell of the carriage at one end of its reciprocation, twist the same during reciprocation of the carriage, and automatically release the end of the twisted band at the dwell or finish of the carriage at the other end of its reciprocation; suitable devices for imparting a rotary twisting movement to the jaws being provided, and means being provided also for causing the jaws to automatically grasp and release the band at the end of the reciprocations of the twister.

In order that my invention may be better understood by those skilled in the art, I have illustrated in the accompanying drawings, to which reference will be made hereinafter, an embodiment of my invention.

In said drawings, Figure 1 is a side view of the twister-carriage and its associated parts, certain portions being shown in section for clearness of illustration. Fig. 2 is a view of the twister from the opposite side of that shown in Fig. 1. Figs. 3 and 4 are opposite end views of the twister, Fig. 4 showing also the supporting-tracks and the driving rack-rail for the twister. Fig. 5 is a plan view of the supporting-tracks upon which the twister-frame reciprocates, showing the twister in position thereon. Figs. 6, 7, 8, and 9 are detail views of the latch mechanism between the driving-shaft of the twister and the ordinary gear-wheel which imparts a rotary movement to the twister-jaws. Fig. 10 is a detail view of the sliding cone for operating the twister-jaws to show the locking-plate with which said cone is provided and which coöperates with a spring locking-bolt to hold the cone in retracted position. Figs. 11 and 12 are respectively plan and front views of the lower twister-jaw, and Figs. 13 and 14 are similar views of the upper twister-jaw.

Referring to the drawings by letters, like letters indicating like parts in the several views, H denotes the supporting-tracks upon which the twister-carriage runs, said twister-carriage being supported on the tracks H by means of the horizontal arms H', said arms being provided with antifriction-rollers $h^{101}$ at their ends. Depending from the said supporting-arms H' are hangers $h\ h'$, on which the twister-head proper is mounted. Said head comprises the band-straw-grasping jaws $h^2\ h^3$, having toothed gripping-faces (see Figs. 1, 2, and 3) to insure a tight hold of the straw, and in order to direct the straw to the grip of the jaws $h^2\ h^3$ the said jaw $h^3$ is provided with an overlapping forked member $h^4$, which straddles the end of the band-straw as it is presented to the said jaws. The said twister-jaws $h^2\ h^3$ are pivoted at the end of the twister-shaft $H^2$, which is rotatably connected with a rotatable collar $h^5$, mounted in the hanger $h'$ and provided with a bevel-pinion $h^6$, by means of which said collar and the twister-head may be rotated. The said pinion $h^6$ is in mesh with a gear-wheel $h^7$, mounted on stub-shaft $h^8$, supported in a bearing carried by a strut $h^9$, the ends of which are secured to plates $H^3$, adjustably mounted on the hangers $h\ h'$ of the twister-carriage, so that by adjusting the plates $H^3$ by the slot-and-bolt connections with which they are secured to the hangers $h\ h'$ the shaft $h^8$ may be raised or lowered to permit gear-wheels $h^{10}$ of different sizes to be used, and thus secure such different speeds for said shaft $h^8$ and its driven parts as may be desired. At its outer end said stub-shaft $h^8$ has a small gear-wheel $h^{10}$, which meshes with a rack $h^{11}$, fixed to the machine-frame, so that as the twister-carriage is moved back and forth the said stub-shaft $h^8$ will be rotated. The gear-wheel $h^7$ is loosely mounted on the shaft $h^8$ and is rotatably connected therewith by means of a spring pawl or latch $h^{12}$, mounted on a collar $h^{13}$, fixed to the shaft $h^8$, said pawl engaging a ratchet $h^{140}$ on the said gear-wheel $h^7$. The result of this construction is that when the shaft $h^8$ is turned in one direction by the engagement of the gear $h^{10}$ with the rack $h^{11}$ the said gear-wheel $h^7$ will be rotated and the twister-head driven. Rotation of the shaft $h^8$ by the pinion $h^{10}$ in the opposite direction upon the return movement of the twister-carriage will not affect the gear-wheel $h^7$, the pawl $h^{12}$ trailing idly over the ratchet $h^{140}$.

The opening and closing of the twister-jaws $h^2$ $h^3$ to grip and release the band is effected in the following manner. As has been stated, said jaws are pivoted at the forward end of the twister-shaft $H^2$, (see Fig. 1,) said jaws having stiff springs $h^{14}$, tending to close the jaws, the springs $h^{14}$ bearing at their rear ends against the inner periphery of the collar $h^5$ to give them the desired tension. The jaws $h^2$ $h^3$ are further provided with rearwardly-projecting tailpieces $h^{15}$, which are engaged by a sliding cone or cup $h^{16}$, mounted on the shaft $H^2$, a spring $h^{17}$ tending to press said cone $h^{16}$ forward to the position shown in full lines, Fig. 1, in which position of the cone the jaws $h^2$ $h^3$ will be held in the full-line open position shown. The said sliding cone $h^{16}$ has a yoke $h^{18}$ secured thereto, said yoke being mounted at its upper end on a sliding rod $h^{19}$ between adjusting-nuts, as clearly shown in Fig. 1, said rod being slidingly mounted in suitable ears on the hangers $h$ $h'$. At one end of said sliding rod $h^{19}$ is an upwardly-projecting arm $h^{20}$, which strikes a stationary projection or stop $h^{201}$ on the machine-frame as the twister-carriage runs forward to the twister-spout G, throwing the sliding rod $h^{19}$ and cone $h^{16}$ to the position shown in dotted lines, Fig. 1, thus releasing the twister-jaws, which are immediately closed by their springs and grasp the end of the band as the carriage comes to a stop or dwell before beginning its return movement. A pin $h^{22}$ on the said rod $h^{19}$ engages and rides in a guard-loop $h^{23}$ on the carriage-frame, so as to prevent the rod $h^{19}$ from turning in its supporting-ears and insuring the retention of the arm $h^{20}$ in proper position to be struck by the stationary stop $h^{201}$ on the harvester-frame at all times. When the rod $h^{19}$ and cone $h^{16}$ are moved to the position shown in dotted lines in Fig. 1 by the operation just described, they are locked in such position by means of a spring-bolt $h^{24}$, mounted on the carriage-frame and resting at its lower end upon a locking-plate $h^{25}$ on the said yoke $h^{18}$, said locking-plate having a hole $h^{26}$ therein, into which the bolt $h^{24}$ drops as the plate $h^{25}$ moves back, a guiding-rib $h^{27}$ on plate $h^{25}$ serving to direct the bolt $h^{24}$ to the receiving-hole $h^{26}$. At its upper end said spring-bolt $h^{24}$ is engaged by a lifting-lever $h^{28}$, which is pivoted to the carriage-frame, said lever $h^{28}$ being tilted to the position shown in dotted lines when the bolt $h^{24}$ is forced downwardly to engage the locking-plate $h^{25}$. The elevated tail of lever $h^{28}$ strikes a roller or other fixed operating device $h^{202}$ on the harvester-frame when the twister-carriage reaches the limit of its outward movement and comes to a stop or dwell, tilting the lever $h^{28}$, raising the spring-bolt $h^{24}$ from engagement with plate $h^{25}$, and allowing the rod-yoke $h^{18}$, rod $h^{19}$, and cone $h^{16}$ to return to the position shown in full lines, Fig. 1, under the action of spring $h^{17}$, this movement of the cone throwing the twister-jaws open and releasing the band.

The twister-carriage and the parts mounted thereon, which have just been described, are moved forward and back on the tracks H by means of a cord $i$, preferably of wire for strength and flexibility, said cord $i$ being attached at either end to turnbuckles $i'$, adjustably secured to the twister-carriage, as shown in Figs. 1 and 2. The said cord $i$ is connected with any suitable driving mechanism, so that a regular reciprocation, with a dwell at each end of the reciprocations, will be imparted to the twister, and as this driving mechanism may be of any suitable type so far as the present invention is concerned I do not deem it necessary to illustrate or describe the same.

It will be understood that while I have shown a particular embodiment of my invention, and that the best now known to me, I do not limit my invention to the details of construction shown and described, except so far as I am limited by the terms of the appended claims, and while my twister is designed, primarily, for use in connection with the self-binder harvester shown and described in my application hereinbefore referred to it will be obvious that the twister may be used in connection with self-binder harvesters of other types or, in fact, wherever it is desired to form a twisted band from loose fibers or strands.

What I claim is—

1. In a band-twister, the combination with a traveling carriage, of band-grasping devices mounted on said carriage, means for automatically opening and closing said band-grasping devices, and means for rotating said band-grasping devices.

2. In a band-twister, the combination with a traveling twister-carriage, of band-grasping jaws mounted on said carriage, and means for rotating said jaws during the outward movement only of said carriage.

3. In a band-twister, the combination with a traveling twister-carriage, of band-grasping devices mounted on said carriage, means for closing said band-grasping devices at a predetermined point in the travel of said carriage, means for rotating said band-grasping devices, and means for opening said band-grasping devices at a predetermined point in the travel of said carriage.

4. In a band-twister, the combination with a traveling twister-carriage, of twister-jaws rotatably mounted thereon, means for closing said twister-jaws at the inner dwell of the twister-carriage to grasp the band, means for rotating said jaws, and means for opening said jaws at the outer dwell of the twister-carriage to release the band.

5. In a band-twister, the combination with a traveling twister-carriage, of spring-closed twister-jaws rotatably mounted thereon, means for releasing said spring-closed twister-jaws at the inner dwell of the twister-carriage to grasp a band, means for rotating said jaws, and means for opening said spring-closed jaws at the outer dwell of the twister-carriage to release the band.

6. In a band-twister, the combination with a traveling twister-carriage, of a rotary shaft mounted therein, twister-jaws pivotally mounted at the forward end of said shaft, means for automatically closing said jaws upon a band as the carriage moves forward, means for rotating said twister shaft and jaws during movement of the carriage, and means for automatically opening said jaws to release the band when the carriage reaches the limit of its outward movement.

7. In a band-twister, the combination with a traveling twister-carriage, of a rotary shaft mounted therein, spring-closed twister-jaws pivotally mounted at the forward end of said shaft, means for automatically releasing said spring-closed jaws to grasp the band as the carriage moves forward, means for rotating said twister shaft and jaws during movement of the carriage, and means for automatically opening said spring-closed jaws to release the band when the carriage reaches the limit of its outward movement.

8. In a band-twister, the combination with a traveling twister-carriage, of a twister-shaft mounted on said carriage, spring-closed twister-jaws pivoted at the forward end of said shaft, means to normally hold said twister-jaws open, means for retracting said jaw-opening means to release said jaws at the limit of the forward movement of said carriage, means for locking said jaw-opening means in retracted position, means for rotating said twister shaft and jaws, and means for releasing said twister-jaw-opening means at the limit of the outward movement of the carriage.

9. In a band-twister, the combination with suitable supporting-tracks, of a twister-carriage mounted on said tracks, a driving-shaft mounted on said carriage, a pinion on said shaft, a fixed rack with which said pinion meshes, a rotary twister-shaft on said carriage receiving motion from said driving-shaft, spring-closed twister-jaws pivoted on said shaft, a spring-actuated sliding cone on said twister-shaft to normally hold said twister-jaws open, means to retract said cone and allow said spring-jaws to close at the limit of forward movement of the carriage, a locking-latch to engage said cone and hold it in retracted position, and means to throw said locking-latch, and release said jaw-opening cone at the limit of outward movement of the carriage.

10. In a band-twister, the combination with suitable supporting-tracks, of a twister-carriage mounted on said tracks, a driving-shaft mounted on said carriage, a pinion on said shaft meshing with a fixed rack, a rotary twister-shaft on said carriage, a pawl-and-ratchet driving connection between the said twister-shaft and said driving-shaft, spring-closed twister-jaws pivoted on said shaft, a spring-actuated sliding cone on said twister-shaft to normally hold said twister-jaws open, means to retract said cone and allow said spring-jaws to close at the limit of forward movement of the carriage, a locking-latch to engage said cone and hold it in retracted position, and means to throw said locking-latch and release said jaw-opening cone at the limit of outward movement of the carriage.

In testimony whereof I affix my signature in presence of two witnesses.

WILLIAM DOUGLASS.

Witnesses:
HENRY CALVER,
A. V. CUSHMAN.